United States Patent
Chan

(10) Patent No.: US 7,141,227 B2
(45) Date of Patent: Nov. 28, 2006

(54) APPARATUS AND METHOD FOR PREPARING CERIUM OXIDE NANOPARTICLES

(75) Inventor: Siu-Wai Chan, Demarest, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 445 days.

(21) Appl. No.: 10/465,942

(22) PCT Filed: May 7, 2002

(86) PCT No.: PCT/US02/14539

§ 371 (c)(1),
(2), (4) Date: Jan. 13, 2004

(87) PCT Pub. No.: WO02/090260

PCT Pub. Date: Nov. 14, 2002

(65) Prior Publication Data

US 2005/0031517 A1 Feb. 10, 2005

Related U.S. Application Data

(60) Provisional application No. 60/333,451, filed on Nov. 27, 2001, provisional application No. 60/302,562, filed on Jul. 2, 2001, provisional application No. 60/289,062, filed on May 7, 2001.

(51) Int. Cl.
*C01F 1/00* (2006.01)
*C01F 17/00* (2006.01)
*B01F 7/00* (2006.01)

(52) U.S. Cl. .............. 423/263; 423/275; 423/21.1; 423/22; 423/23; 423/138; 423/42; 423/140; 423/142; 422/224; 422/225

(58) Field of Classification Search ............... 423/263, 423/275, 21.1, 22, 23, 138, 42, 140, 142; 422/224, 225
See application file for complete search history.

(56) References Cited

U.S. PATENT DOCUMENTS 3,730,394 A * 5/1973 Woodson .................. 222/137
3,908,966 A   9/1975 Boden et al. .............. 259/4

(Continued)

OTHER PUBLICATIONS

Mogesen, M., Sammes, N. M. and Tompsett, G. A., "Physical, chemical and electrochemical properties of pure and doped ceria", *Solid State Ionics*, vol. 172 (2000), p. 63-94.

(Continued)

*Primary Examiner*—Timothy C. Vanoy
(74) *Attorney, Agent, or Firm*—Baker Botts LLP

(57) ABSTRACT

This invention provides a method for preparing cerium oxide nanoparticles with a narrow size distribution. The cerium oxide nanoparticles obtained by the method of the invention are nearly all crystalline. The method comprises providing a first aqueous solution comprising cerium nitrate and providing a second aqueous solution comprising hexamethylenetetramine. The first and second aqueous solutions are mixed to form a mixture, and the mixture is maintained at a temperature no higher than about 320° K to form nanoparticles. The nanoparticles that are formed are then separated from the mixture. A further aspect of the present invention is an apparatus for preparing cerium oxide nanoparticles. The apparatus comprises a mixing vessel having a first compartment for holding a first aqueous solution comprising cerium nitrate and a second compartment for holding a second aqueous solution comprising hexamethylenetetramine. The mixing vessel has a retractable partition separating the first and second compartments.

37 Claims, 6 Drawing Sheets

U.S. PATENT DOCUMENTS

| | | | |
|---|---|---|---|
| 4,676,406 A | * | 6/1987 | Frischmann et al. ........ 222/136 |
| 5,501,371 A | * | 3/1996 | Schwartz-Feldman ...... 222/136 |
| 5,891,412 A | * | 4/1999 | Le Loarer et al. .......... 423/263 |
| 2002/0031470 A1 | | 3/2002 | Inagaki et al. |
| 2004/0241070 A1 | * | 12/2004 | Noh et al. .................. 423/263 |

OTHER PUBLICATIONS

Tsunekawa, S., Ishikawa, K., Li, Z. Q., Kawazoe, Y. and Kasuya, Y., "Origin of Anomaious Lattice Expansion in Oxide Nanoparticles", *Physics Review Letters*, vol. 85 (2000), p. 3440-3443.

Tsunekawa, S., Sahara, R., Kawazoe, Y. and Ishikawa, K., "Lattice relaxation of monosize $CeO_{2-x}$ nanocrystalline particles", *Applied Surface Science*, vol. 152 (1999), p. 53-56.

Chiang, Y.M., Lavik, E. B., Kosacki, I., Tuller, H. L. and Ying, J. Y., "Nonstoichiometry and Electrical Conductivity of Nanocrystalline $CeO_{2-x}$", *Electroceramics*, vol. 1 (1997), p. 7-14.

Chikyow, T., Bedair, S. M., Tye, L. and El-Masry, N. A., "Reaction and regrowth control of $CeO_2$ on Si(111) surface for the silicon-on-insulator structure", *Applied Physics Letters*, vol. 65 (1994), p. 1030-1032.

Walkenhorst, A., Schmitt, M., Adrian, H. and Petersen, K., "$CeO_2$: An alternative insulator material for superconducting field effect devices", *Applied Physics Letters*, vol. 64 (1994), p. 1871-1873.

Chen, P. L. and Chen, I. W., "Reactive Cerium(IV) Oxide Powders by the Homogeneous Precipitation Method", *Journal of the American Ceramic Society*, vol. 76 (1993), p. 1577-1583.

Lampe, U., Gerblinger, J. and Meixner, H., "Comparison of transient response of exhaust-gas sensors based on thin films of selected metal oxides", *Sensors and Actuators B—Chemical*, vol. 7 (1992), p. 787-791.

Brus, L. E., "Quantum crystals and nonlinear optics", *Applied Physics A*, vol. 53 (1991), p. 465-474.

Steele, B. C. H., "Mass transport in materials incorporated in electrochemical energy conversion systems", *Solids State Ionics*, vol. 12 (1984), p. 391-406.

Haas, G., Ramsey, J. B. and Thun, R., "Optical Properties and Structure of Cerium Dioxide Films", *Journal of the Optical Society of America*, vol. 48 (1957), p. 324-327.

* cited by examiner

APPARATUS AND METHOD FOR PREPARING CERIUM OXIDE NANOPARTICLES

CROSS-REFERENCE TO RELATED APPLICATION

This application claims priority from U.S. Provisional Application Ser. No. 60/289,062, filed May 7, 2001, U.S. Provisional Application Ser. No. 60/302,562, filed Jul. 2, 2001, and U.S. Provisional Application Ser. No. 60/333,451, filed Nov. 27, 2001, which are all incorporated herein by reference in their entirety.

BACKGROUND OF THE INVENTION

1. Field of the Invention

The invention is directed to a method and apparatus for the preparation of nanoparticles of cerium oxide. In particular, the invention is directed to a method and apparatus for the preparation of cerium oxide nanoparticles having a narrow size distribution.

2. Background Information

Cerium oxide in the form of fine particles is useful as a catalyst for polymerization, for reforming fuels, and for abating polluting gas in automobile exhaust systems. The catalyst acts as an oxygen pressure regulator in the reduction of $NO_x$ to molecular nitrogen, the oxidation of hydrocarbons and carbon monoxide to water and carbon dioxide, and the conversion of $H_2S$ to $H_2$ and S.

Cerium oxide has been used as a catalyst-component for the recombination of hydrogen and oxygen to water for sealed car batteries, which extends battery life. The oxide is a good ionic conductor and has been used as an electrolyte material for a solid oxide fuel cells and gas sensors, as discussed, for example, by Steele, B. C. H., *Solids State Ionics*, Vol. 12 (1984), p. 391. The oxide has a high dielectric constant and a high refractive index (useful for optical coatings), and can be used as an insulating layer on semiconductor substrates. Cerium oxide is also of interest as a catalyst in vehicle emissions systems, as discussed in Yao, Y. F. and Kummer, J. T., *Journal of Catalysis, Vol.* 103 (1987), p. 307, and has also found use as a solid oxide fuel cell electrolyte material, as shown in Mogesen, M., Sammes, N. M. and Tompsett, G. A., *Solid State Ionics*, Vol. 172 (2000), p. 63; in gas sensors, as described in Lampe, U., Gerblinger, J. and Meixner, H., *Sensors and Actuators B—Chemical*, Vol. 7 (1992), p. 787; in optical coatings, as described in Haas, G., Ramsey, J. B. and Thun, R., *Journal of the Optical Society of America*, Vol. 48 (1957), p. 324; in high-$T_c$ superconductor structures, as discussed in Walkenhorst, A., Schmitt, M., Adrian, H. and Petersen, K., *Applied Physics Letters*, Vol. 64 (1994), p. 1871; and silicon-on-insulator structures and high storage capacitor devices, as shown by Chikyow, T., Bedair, S. M., Tye, L. and El-Masry, N. A., *Applied Physics Letters*, Vol. 65 (1994), p. 1030. Because of the relative hardness of the material, cerium oxide nanoparticles are also useful as an abrasive for fine polishing of surfaces of certain materials, such as quartz and silicon.

Some applications may benefit from using monodispersed cerium oxide nanoparticles, due to either possibly new properties when such particles are nanodimensional or the greater control in uniform structures. A sub-micron scale cerium oxide powder has been prepared and used to decrease the sintering temperature from 1500° C. to 1200° C., as described by Chen, P. L. and Chen, I. W., *Journal of the American Ceramic Society*, Vol. 76 (1993), p. 1577; however, there has been no report of any method for preparing cerium oxide nanoparticles having dimensions smaller than about 14.5 nm, and no report of cerium oxide particles having monodispersity. The electrical conductivity of multi-dispersed nanoparticles of cerium oxide prepared by a vacuum technique has been investigated by Chiang, Y. M., Lavik, E. B., Kosacki, I., Tuller, H. L. and Ying, J. Y., *Electroceramics*, Vol. 1 (1997), p. 7. The vacuum sputtering technique used by Chiang et al. usually yields cerium oxide particles of a large size distribution, which makes it very difficult to test and sort out particle-size effects on the catalytic process for certain reactions. Tsunekawa, S., Sahara, R, Kawazoe, Y. and Ishikawa, K, *Applied Surface Science*, Vol. 152 (1999), p. 53; and Tsunekawa, S., Ishikawa, K, Li, Z. Q., Kawazoe, Y. and Kasuya, Y., *Physics Review Letters*, Vol. 85 (2000), p. 3440, both claim to have prepared mono-sized nanoparticles of cerium oxide and reported lattice expansions with decreasing particle-size in a few nanosized cerium oxide particles. Both papers suggest that a decrease in the size of cerium oxide nanoparticles is accompanied by a significant increase in the lattice parameter. Neither paper, however, discloses the method of preparation of cerium oxide nanoparticles or the apparatus used.

The foregoing discussion shows that there is a need in the art for an efficient method and apparatus for preparing significant quantities of cerium oxide nanoparticles with a relatively narrow size distribution.

SUMMARY OF THE INVENTION

The aforementioned need is substantially met by the present invention, which in one aspect is a method for preparing cerium oxide nanoparticles. The method comprises providing a first aqueous solution comprising cerium nitrate and providing a second aqueous solution comprising hexamethylenetetramine. The first and second aqueous solutions are mixed to form a mixture, and the mixture is maintained at a temperature no higher than about 320° K to form nanoparticles therein. The nanoparticles that are formed are then separated from the mixture.

Another aspect of the present invention is a method for preparing cerium oxide nanoparticles, where a first aqueous solution comprising cerium nitrate is provided in a first compartment of a mixing vessel and a second aqueous solution comprising hexamethylenetetramine is provided in a second compartment of the mixing vessel, the first and second compartments being separated by a retractable partition. The retractable partition is retracted to allow the first and second aqueous solutions to mix so as to form a mixture, and the mixture is maintained at a temperature no higher than about 320° K to form nanoparticles. The nanoparticles that are formed are then separated from the mixture.

Still another aspect of the present invention is a method for preparing cerium oxide nanoparticles, where a first aqueous solution comprising one of cerium nitrate and hexamethylenetetramine is provided in a mixing vessel having at least one inlet. A second aqueous solution comprising the other one of cerium nitrate and hexamethylenetetramine is pumped into the mixing vessel through the at least one inlet so as to cause mixing of the first and second aqueous solutions to form a mixture. The mixture is maintained at a temperature no higher than about 320° K to form nanoparticles. The nanoparticles that are formed are then separated from the mixture.

A further aspect of the present invention is an apparatus for preparing cerium oxide nanoparticles. The apparatus comprises a mixing vessel having a first compartment for holding a first aqueous solution comprising cerium nitrate and a second compartment for holding a second aqueous solution comprising hexamethylenetetramine. The mixing vessel has a retractable partition separating the first and second compartments. When the retractable partition is retracted, rapid mixing of the first aqueous solution with the second aqueous solution takes place to form a mixture, and the mixture is maintained in a mixing vessel at a temperature no higher than about 320° K to form nanoparticles therein.

The method and apparatus of the invention have the advantage of being usable to prepare cerium oxide in a quantity which is limited only by the size of the mixing vessel. We have prepared up to about 70 gm of nanoparticles per batch. This is a very large amount when compared to the scale of nanoparticle synthesis of the prior art. By providing for a fast reaction rate and controlling the reaction time, cerium oxide nanoparticles can be prepared within the desired size distribution. The method and mixing vessel also have the advantage of providing cerium oxide nanoparticles which are crystalline.

DETAILED DESCRIPTION OF THE INVENTION

Figure 2A:
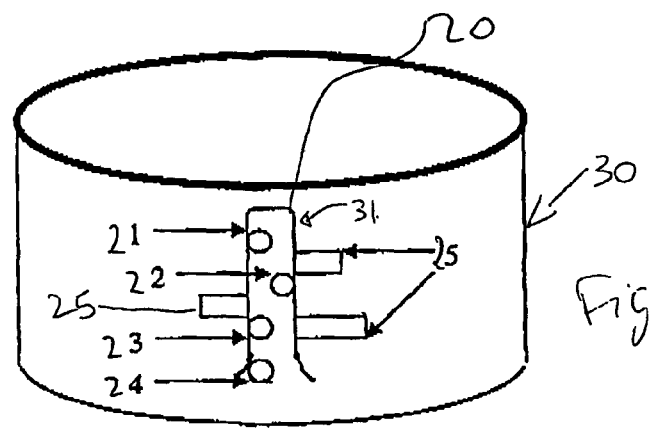
FIGS. 2A–2C depict a side view and two top views, respectively, of one embodiment of the mixing vessel according to the present invention.
Figure 2B:
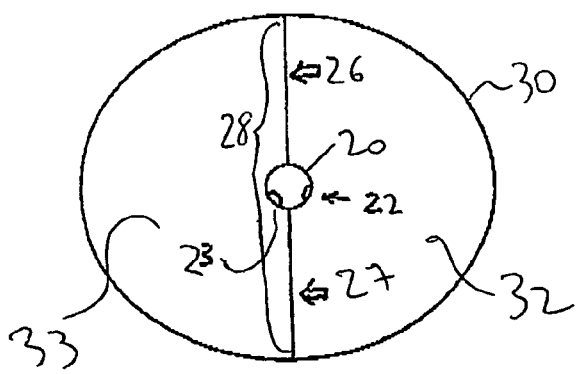

Referring to FIG. 2B, there is shown a top view of an exemplary embodiment of a mixing vessel 30 separated into two sealed compartments 32 and 33 by a retractable partition 28 comprising two foldable panels 26 and 27. One of the compartments 32 and 33 contains an aqueous solution of cerium nitrate ($Ce(NO_3)_3$) at a concentration in the range of about 0.0037 M to 0.04 M, while the other of the compartments 32 and 33 contains an aqueous solution of hexamethylenetetramine at a concentration of about 0.5 M to about 1.5 M, preferably in the range of about 0.5 M to about 1.5 M.

Figure 2C:
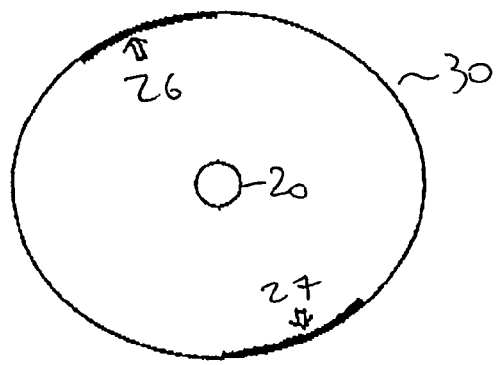

Turning to FIG. 2C, when the retractable partition 28 of the mixing vessel 30 is retracted by folding the two panels 26 and 27 against the inner wall of the mixing vessel 30 the aqueous solution of cerium nitrate and the aqueous solution of hexamethylenetetramine rapidly mixed to form a mixture. The mixture is maintained in the mixing vessel 30 at a temperature no higher than 320° K., preferably at 300° K, to form nanoparticles therein. Initial rapid mixing enables the nanoparticles to nucleate at approximately the same time. Following nucleation, the nanoparticles all grow at the same rate in the course of the reaction, thereby ensuring monodispersity of the nanoparticles.

Figure 1:
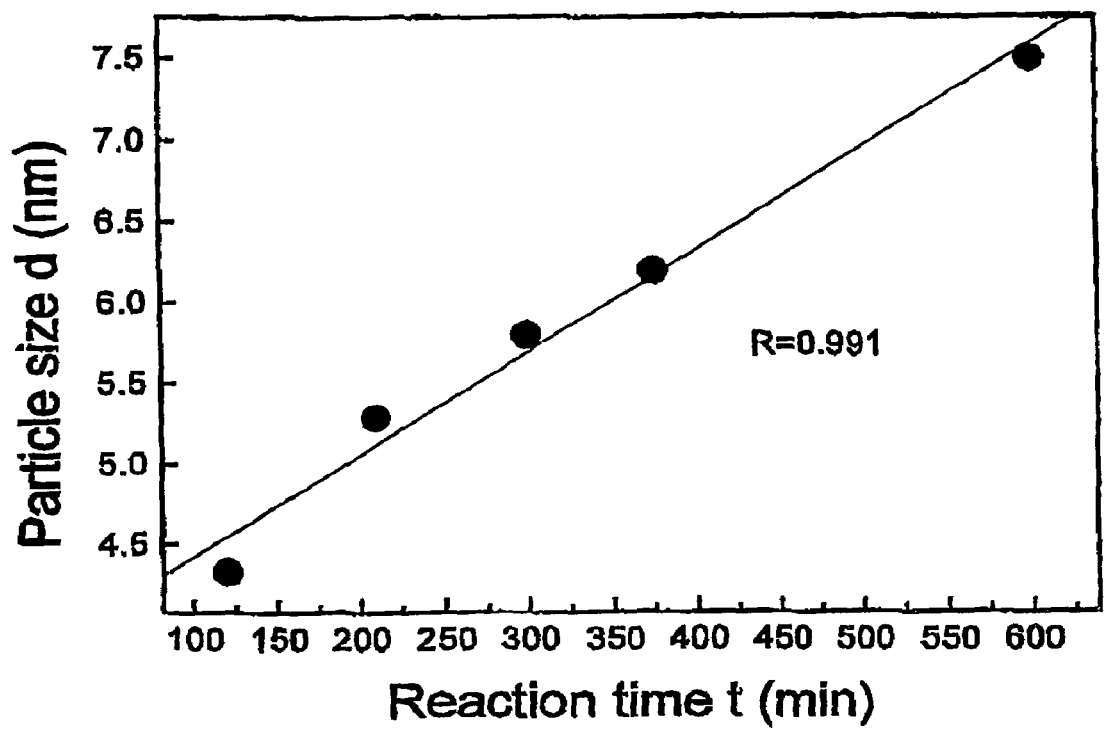
FIG. 1 is a graphical plot showing the variation of cerium oxide particle size as a function of the time of mixing of the reactants at 300° K

Referring to FIG. 2A, while the mixture is maintained in the mixing vessel 30 at a temperature no higher than about 320° K, it is being continuously stirred with a mechanical stirrer 31 built into the mixing vessel 30. The mechanical stirrer 31 comprises a vertical rotatable rod 20 having a plurality of horizontal stirring rods 25 attached thereto. The exemplary mixing vessel of FIGS. 2A, 2B and 2C will be described in greater detail hereinbelow. The stirring of the mixture is performed for a period between about 2 hours and about 24 hours, preferably between about 5 hours and about 24 hours. By controlling the reaction to such a time interval, batches of approximately spherical cerium oxide particles of a size ranging from 3 nm to about 12 nm in diameter are obtained. FIG. 1 is a graphical plot showing the increase in particle size with increasing reaction time.

In another exemplary embodiment of the present invention, either one of the two aqueous solutions comprising cerium nitrate and hexamethylenetetramine, respectively, may be placed in a mixing vessel, and the other one of the aqueous solutions is poured into the mixing vessel to cause mixing of the two aqueous solutions to form a mixture. The mixture is maintained in the mixing vessel 30 at a temperature no higher than about 320° K to form nanoparticles therein. The nanoparticles formed in the mixture are then separated from the mixture.

The nanoparticles obtained by the method of the invention have a cerium to oxygen ratio corresponding to the formula $CeO_{2-y}$, where y ranges from 0 to 0.5. Advantageously, the value of y is 0. For at least some nanoparticles, X-ray absorption spectroscopy measurements indicate the presence of both tetravalent and trivalent cerium ions. Accordingly, for these nanoparticles, the value of y in the above formula is greater than 0. At least some tetravalent cerium is present in most nanoparticles, since at least some of the $Ce^{3+}$ ions are oxidized to $Ce^{4+}$ ions by oxygen in the air. Accordingly, the value of y is typically less than 0.5, which would correspond to pure $Ce_2O_3$, and ranges from 0 to about 0.35.

The nanoparticles are monodispersed, wherein the term as used herein is intended to mean particles in which the full width at half maximum (FWHM) of the size distribution plot for a batch of 100 or more particles is less than +/−15% of the median size. The nanoparticle size increases with increasing length of the reaction time. Larger cerium oxide nanoparticles are obtained when the sting of the mixture is carried out for about 12 to about 24 hours.

After completion of the maintaining and sting, the resulting mixture is centrifuged to separate nanoparticles of $CeO_{2-y}$, where y ranges from 0 to about 0.35, from the reaction mixture.

The nanoparticles separated by centrifugation may be sintered to obtain larger nanoparticles. To this end, The larger cerium oxide nanoparticles after centrifugation are sintered in air at temperatures ranging between about 400° and about 800° C. for a period of time between about 8 and about 16 hours. The sintering temperature is ramped up at a rate of about 100° C./hr, and the temperature is preferably maintained at its maximum value for about 30 minutes. Thereafter, the sintering temperature is ramped down at a rate of about −100° C./hr, until the initial temperature is reached.

Without wishing to be bound by any theory or mechanism, it is believed that hexamethylenetetramine hydrolyzes slowly to produce formaldehyde and ammonia. Ammonia then reacts with water to become ammonium hydroxide. As a result, the pH increases to a value of about 8. Since cerium oxide contains cerium in an oxidation state of +4, which is a Lewis acid, an increase in pH favors the formation of cerium oxide. As cerium oxide starts to form, the pH of the mixture drops to 6.5 after 200 minutes and reaches a steady state value of about 6.1 after about 1000 minutes for the reaction of a 0.5 M solution of hexamethylenetetramine in water with a solution of 0.0375 M cerium nitrate in water.

The method of the invention may be used to prepare cerium oxide nanoparticles which contain additional components, including the incorporation of metals and other materials. These components can be incorporated onto, or into, the nanoparticles. For example, platinum may be impregnated onto the cerium oxide nanoparticles obtained by the procedure described above by soaking the cerium oxide nanoparticles in a solution of chloroplatinic acid, $H_2PtCl_6$, followed by drying. The soaking step may be preceded by a centrifugation step which separates the nanoparticles from the mixture in which they are produced. Similarly, gold, palladium, copper or nickel may be incorporated onto the cerium oxide nanoparticles by soaking the nanoparticles in solutions comprising ions or complex ions of the respective metals.

Referring to FIG. 2A, in an exemplary embodiment of the apparatus of the invention, the mixing vessel 30 comprises an inlet for each solution of the reactants and at least one outlet for removal of liquid from the vessel 30. In a particularly advantageous embodiment of the mixing vessel, the vessel 30 comprises a mechanical stirrer 31. The stirrer 31 comprises a vertical rod 20 which can spin about its axis when driven by a drive motor (not shown) coupled thereto. Rod 20 is advantageously coated with a chemically inert layer such as TEFLON.® Rod 20, which is positioned along the vertical axis of the cylindrical mixing vessel 30, bears a plurality of horizontal stirring rods 25 and contains apertures 21, 22, 23, for fitting inlet feeds (not shown) for water, a solution of cerium nitrate and a solution of hexamethylenetetramine, respectively, and an outlet drain 24 for removal of liquid from the mixing vessel 30. To prevent contamination of the reactants, the apertures 21, 22, and 23 only allow flow into the mixing vessel 30, and the outlet drain 24 only allows flow out of the vessel 30. The vessel 30 also includes a retractable partition 28. As shown in FIGS. 2B and 2C, which are top views of the mixing vessel 30, the retractable partition 28 consists of two retractable elements 26 and 27. The retractable elements 26 and 27 are foldable against the inner wall of the mixing vessel 30. Before mixing occurs, the two retractable elements 26 and 27 unfold from the wall of the vessel 30 and extend to the center rod 20 of the stirrer 31, as shown in FIG. 2B. Each of panels 26 and 27 of retractable partition 28 is of a width sufficient for the panel to reach the center rod 20 and form a seal with the center rod 20, and has a height (not shown in the figure) that is greater than the height of the center rod 20. Each of the panels 26 and 27 also forms a seal with the bottom and inner side wall of the mixing vessel 30 when the partition 28 is closed, thereby defining two sealed compartments 32 and 33. The cerium nitrate solution is provided through an inlet feed fitted to aperture 22 to compartment 32, while the hexamethylenetetramine solution is provided through an inlet feed fitted to aperture 23 to compartment 33. Accordingly, before the retractable panels 26 and 27 are folded against the inner wall of the mixing vessel 30, compartment 32 contains only the aqueous solution of cerium nitrate and compartment 33 contains only the aqueous solution of hexamethylenetetramine. To start the reaction, the retractable panels 26 and 27 are folded against the inner wall of the mixing vessel 30 to enable rapid mixing of the two solutions, as shown in FIG. 2C. Each of the foldable panels 26 and 27 includes a layer that is made from a chemically inert "shape memory" alloy.

When the panels 26 and 27 are folded, the layer is "trained" by heating to conform to the shape of the cylindrical wall of the vessel 30. Advantageously, the chemically inert "shape memory" alloy is Nitinol. The Nitinol layer may be heated by a heating coil (not shown in FIG. 2C) plated onto a thin, soft plastic layer adjacent to the Nitinol layer.

Figure 3:
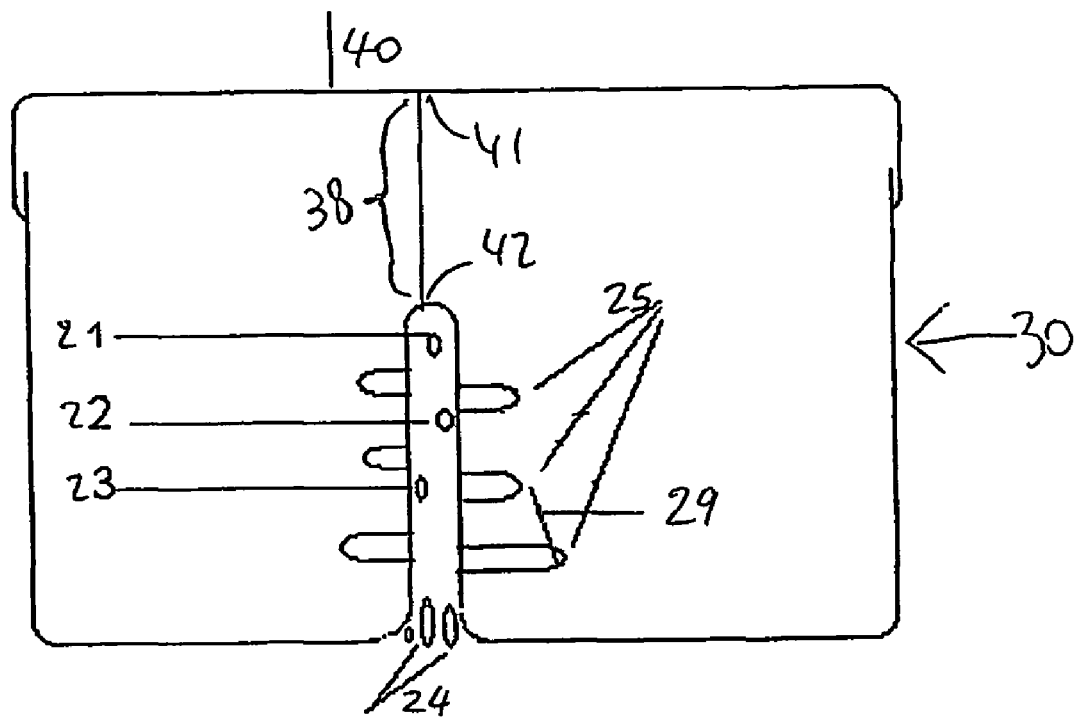
FIG. 3 depicts a side view of another embodiment of the mixing vessel according to the present invention.

FIG. 3 shows a side view of the mixing vessel 30 that includes a tight cover 40 with a seal (not shown) to prevent spills during the mixing of the reactants and during the centrifugation which may follow maintaining and stirring of the mixture, as is further discussed herein. The mixing vessel 30 in the embodiment of FIG. 3 is transparent to light and vertical separations 29 of the horizontal stirring rods 25 define regions of the mixture in which nanoparticles forming in such regions may be studied by light absorption. This technique enables monitoring of the size of the nanoparticles in the regions of the mixture defined by the separations 29 of the horizontal stirring rods 25 so as to allow monitoring of the reaction progress. An additional light absorption region 38 is defined by the vertical separation between the center 41 of the cover 40 and the top 42 of the vertical rod 20. Both the center 41 of the cover 40 and the top 42 of the vertical rod 20 remain stationary during the spinning of the vertical rod 20. The mixing vessel 30 may be made of a material transparent to light, such as quartz. Alternatively, the mixing vessel may contain windows of a material transparent to light which allow light to reach the absorption regions 29 and 38.

When the retractable partition is retracted, the respective solutions in the first and second compartments 32 and 33 of the mixing vessel 30 mix and nanoparticles of cerium oxide begin to form. At the appropriate time, which depends on the desired particle size as discussed above, the mixture may be centrifuged to separate the particles from the mixture. In an advantageous embodiment of the invention, the mixing vessel can also serve as a centrifuging vessel.

The removal of the retractable partition ensures that a thorough initial mixing takes place in a short time. Preferably, the time for fully retracting the partition is between 0.1 and 5 seconds. Without wishing to be bound by any theory, it is believed that during the first mixing of the two solutions, the nucleation of the $CeO_2$ particles occurs. After the first mixing, the chemical driving force and the corresponding concentrations are too low for the generation of new surfaces required for further nucleation of particles, but are still sufficient for continuous growth of the existing nucleated particles. The monodispersity of the resulting nanoparticles is believed to be the result of the initial nucleation and subsequent growth at a uniform rate.

Figure 4:
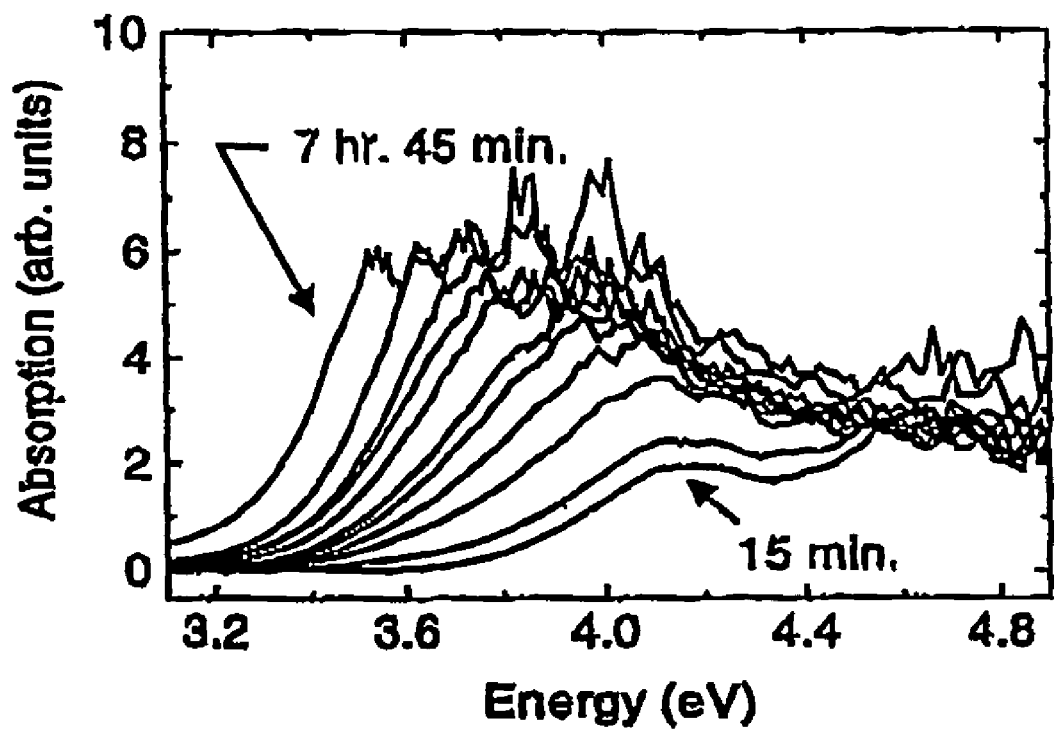
FIG. 4 are graphical plots showing the variation of the light absorption spectrum of the reaction mixture with the cerium oxide particle size at different stages of the reaction.

Advantageously, the stirrer 31 stirs the mixture at a rate of about 50 to about 300 rpm for the duration of the reaction, which depends on the desired particle size as discussed above. The string rate depends on the viscosity of the mixture. The reaction may also proceed without stirring when the total volume of the reaction mixture is about 20 ml or less. A reaction on this scale may be conducted by mixing the two solutions in a vial of methyl methacrylate and the progress of the reaction may be monitored by measuring the light absorption of the mixture in the vial at different reaction times. FIG. 4 shows plots of light absorption versus photon energy measured in about 5 ml of a reaction mixture in a plastic vial for different reaction times. As the reaction time increases, the maximum in the light absorption spectrum shifts to lower photon energies. The shift to lower is photon energies is consistent with an increase in the size of the nanoparticles absorbing the radiation, as is discussed in Brus, L. E., "*Quantum crystals and nonlinear optics,*"

Applied Physics A, Vol. 53 (1991), p. 456, herein incorporated by reference in its entirety.

In an another embodiment of the invention, the mixing vessel (not shown) does not have a retractable partition as shown in FIG. 2, but has one or more detachable liners (not shown) made from a chemically inert material, such as TEFLON® or polyethylene, which adhere to the inner wall of the vessel. In this embodiment, either one of the two solutions is first placed in a mixing vessel. The second solution is then pumped into the mixing vessel containing the first solution through a plurality of inlets (not shown) which are distributed throughout the mixing vessel. Advantageously, the second solution is pumped at high pressure to ensure initial rapid and thorough mixing and nucleation of the nanoparticles at approximately the same time. The nanoparticles all grow at the same rate and thereby achieve monodispersity. Upon completion of the reaction, the reaction mixture may be centrifuged using the mixing vessel as the centrifuging vessel. Centrifugation drives the majority of the particles onto the detachable liners covering the inner wall of the mixing vessel. These nanoparticles may then be obtained by detaching the liners from the inner wall of the mixing vessel.

In another advantageous embodiment of the invention, the mixing vessel is positioned inside a centrifuge. The suspension that results from the formation of the cerium oxide nanoparticles in the aqueous medium can be centrifuged at 10,000 rpm or higher to separate the particles and the supernatant when the particles reach a desired size. The time required for separation by centrifugation depends on the particle size. For example, for 8 nm particles, the centrifugation time for complete separation is around 50 minutes for a 10 cm radius centrifuge spinning at 10,000 rpm. In general, the time required is readily calculated from standard centrifugation equations for separating particles from a liquid suspension, as are known to persons of ordinary skill in the art. The process of separation is effective in the case of cerium oxide particles due to the substantial difference in the densities of the supernatant ($\rho \cong 1$ gm/cm$^3$) and the CeO$_{2-y}$ particles ($\rho \cong 7.2$ gm/cm$^3$).

Figure 5:
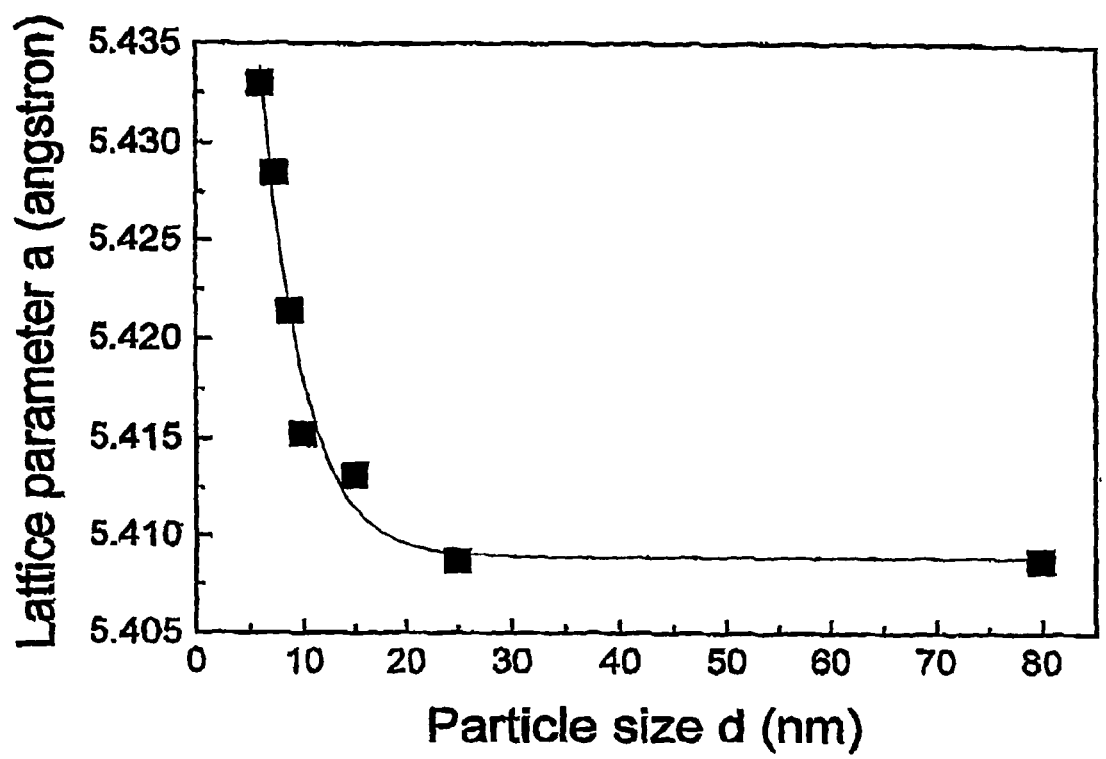
FIG. 5 is a graphical plot showing lattice parameter versus particle size of cerium oxide for a particle size less than 80 nm.

Over 99% of the cerium oxide nanoparticles obtained by the method of the invention are single crystals, and the cerium oxide particle diameter may be measured by X-ray diffraction. X-ray diffraction experiments may be performed using a diffractometer of model Scintag X2 with Cu K$\alpha$ irradiation under the same conditions, including the same scan rate (0.025 degree/step, 5 s/step). The lattice parameter a is determined from fitting the x-ray diffraction peak position. The mean particle diameter $\chi_0$ is determined from the peak width using the Scherrer formula, $\chi_0=0.94\lambda/B \cos \theta_B$, where $\lambda$ is the wavelength of the Cu K$\alpha_1$ line, $\theta_B$ is the angle between the incident beam and the reflecting lattice planes, and B is the width (in radians) of the diffraction peak. The size dispersion is approximately gaussian with a full width at the 1/e$^2$ points, $\Delta\chi$, which is 44% of the mean diameter. The lattice parameter decreases with increasing particle size for particle sizes smaller than about 25 nm, as shown by the curve in FIG. 5. The lattice parameter of micron-scale cerium oxide particles (not shown in FIG. 5) available from Alfa Aesar is 5.4087 Å. The lattice parameter of 6.1 nm particles is 5.4330 Å, representing a 0.45% increase when compared to the lattice parameter of micron-scale cerium oxide particles.

Figure 6:
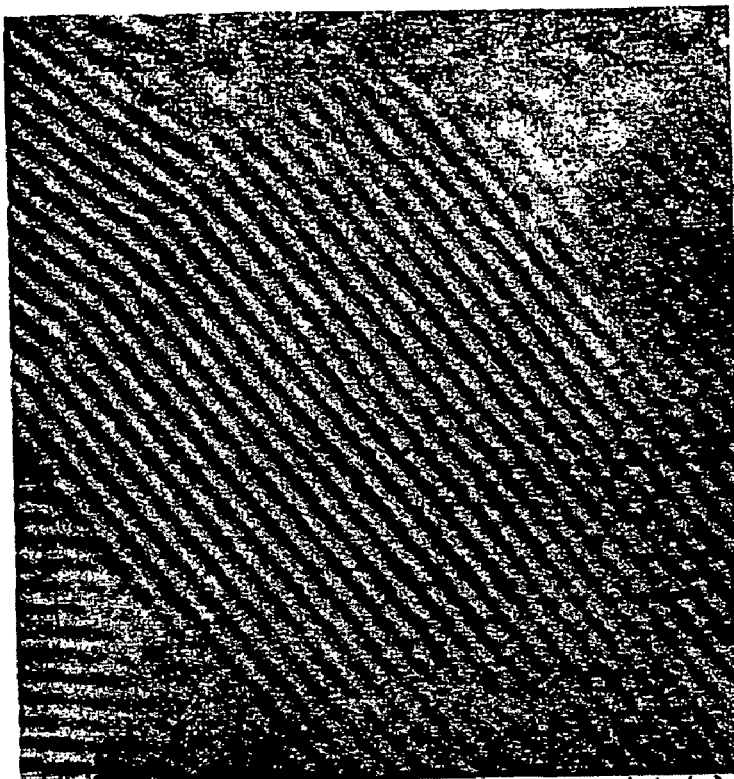
FIG. 6 depicts a high resolution TEM image of cerium oxide nanoparticles showing (111) planes with 0.3 nm spacing.
Figure 6:
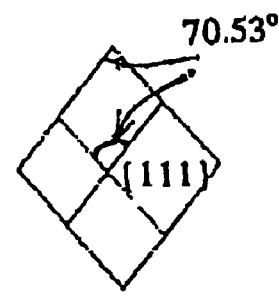
Figure 6:
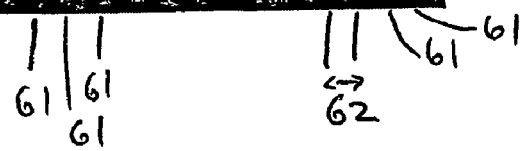

The size of the particles may also be measured from high resolution transmission electron micrographs (TEM). The full width at half maximum (FWHM) of the size distribution peak for a batch of 100 or more particles of cerium oxide is found to be less than +/−15% of the median size. The lattice images of over 50 synthesized nanoparticles indicate that over 99% of the synthesized individual nanoparticles are single crystals. As an example, reference is made to FIG. 6, in which two sets of <111> planes are imaged from an octahedral particle with the electron beam parallel to the two <110> edges of the octahedron. The particle size can be then obtained by multiplying the number of <111> plane images 61 by the distance 62 between successive <111> planes. Imaging the <111> atomic planes for a particle of known size provided a value of the distance between successive <111> planes of 0.3 nm. The size of any particle may be then measured by multiplying this value by the number of <111> plane images for that particle. The particle sizes obtained from TEM agree with the particle sizes measured by X-ray diffraction data.

Table 1 shows a summary of the values of mean particle diameter $\chi_0$ and lattice parameters a for different sample pellets prepared under different preparation conditions using varying reaction times and sintering temperatures. Sample pellet A is a reference 5 μm pellet available from Alfa Aesar. While sintering is not a required step for the preparation of the nanoparticles according to the method of the invention, sintering may be used to obtain larger nanoparticles than the nanoparticles obtained after centrifugation but before sintering. Samples B–D were maintained at the sintering temperatures shown in Table 1 for 30 minutes.

TABLE 1

| Sample | Mixing Time (hrs.) | Sintering Temperature (° C.) | $\chi_0$ | a (nm) |
|---|---|---|---|---|
| A | N/a | — | ~5 μm | 0.54087 |
| B | 12 | 850 | ~25 nm | 0.54087 |
| C | 12 | 700 | ~15 nm | 0.54131 |
| D | 12 | 600 | ~10 nm | 0.54152 |
| E | 8 | not sintered | ~7.4 nm | 0.54285 |
| F | 5 | not sintered | ~6.1 nm | 0.54330 |

EXAMPLE

Preparation of Cerium Oxide Nanoparticles 750 ml of an aqueous solution of 0.00375 M of Ce(NO$_3$)$_3$ was placed in the first compartment of a mixing vessel having two compartments separated by a retractable partition, and 750 ml of an aqueous solution of 0.5 M hexamethylenetetramine was placed in the second compartment of the mixing vessel. The partition was retracted and the resulting mixture was constantly stirred at about 300° K for 12 hours to yield CeO$_{2-y}$ nanoparticles of about 12 nm in diameter, where 0<y<0.35. CeO$_{2-y}$ nanoparticles were obtained with about 30% yield, which represents a very high yield for cerium oxide nanoparticle preparation. The average nanoparticle growth rate observed was of one monolayer per 15 minutes.

It should be understood that various changes and modifications to the exemplary embodiments described herein will be apparent to those skilled in the art without departing from the spirit and scope of this invention, which is defined by the appended claims.

I claim:

1. A method for preparing cerium oxide nanoparticles comprising the steps of:
    (a) providing a first aqueous solution comprising cerium nitrate;

(b) providing a second aqueous mixture comprising hexamethylenetetramine;

(c) rapidly mixing the first aqueous solution with the second aqueous solution to form a mixture;

(d) maintaining the mixture at a temperature no higher than about 320° K to form nanoparticles in the mixture; and (e) separating the nanoparticles formed in the mixture from the mixture.

2. The method of claim 1, wherein the first aqueous solution is provided in a first compartment of a mixing vessel, and the second aqueous solution is provided in a second compartment of the mixing vessel, the first and second compartments being separated by retractable partition, and wherein the mixing step comprises retracting the retractable partition of the mixing vessel to cause mixing of the first aqueous solution with the second aqueous solution to form the mixture.

3. The method of claim 1, wherein one of the first and second aqueous solutions is provided in a mixing vessel having at least one inlet, and the other of the first and second aqueous solutions is pumped into the mixing vessels through the at least one inlet to cause rapid mixing of the first and second aqueous solutions to form the mixture.

4. The method of claim 1, wherein the first aqueous solution has a concentration of cerium nitrate in the range of about 0.005 M to about 0.04 M.

5. The method of claim 1, wherein the second aqueous solution has a concentration of hexamethylenetetramine in the range of about 0.05 M to about 1.5 M.

6. The method of claim 5, wherein the concentration of hexamethylenetetramine is in the range of about 0.5 M to about 1.5 M.

7. The method of claim 1, further comprising the step of stirring the mixture while the mixture is maintained at a temperature no higher than about 320° K.

8. The method of claim 2, wherein the mixing vessel includes a mechanical stirrer and the mixture is stirred with the mechanical stirrer.

9. The method of claim 8, wherein the mechanical stirrer comprises a vertical stirring rod having a plurality of stirring elements attached thereto.

10. The method of claim 9, wherein the vertical stirring rod has a first aperture for fitting a first inlet feed for introducing the first aqueous solution and a second aperture for fitting a second inlet feed for introducing the second aqueous solution, wherein the first inlet feed leads into the first compartment and the second inlet feed leads into the second compartment of the mixing vessel when the retractable partition is in place.

11. The method of claim 10, wherein the vertical stirring rod further includes an outlet drain for the removal of liquid from the mixing vessel.

12. The method of claim 1, wherein the mixture is maintained at a temperature no higher than about 320° K for a time period between about 2 hours and about 24 hours.

13. The method of claim 12, wherein the time period is between about 5 hours and about 24 hours.

14. The method of claim 12, wherein the time period is between about 12 hours and about 24 hours.

15. The method of claim 1, further comprising the step of sintering the nanoparticles separated in step (e) in air at a temperature in the range of about 400° C. to about 800° C.

16. The method of claim 1, wherein step (e) comprises centrifuging the mixture to separate the nanoparticles from the mixture.

17. The method of claim 2 or 3, wherein the step of separating the nanoparticles from the mixture comprises the steps of positioning the mixing vessel inside a centrifuge and centrifuging the mixture in the mixing vessel.

18. The method of claim 1, wherein the cerium oxide nanoparticles include single crystalline cerium oxide nanoparticles.

19. The method of claim 2, wherein retracting the retractable partition takes place in about 0.1 seconds to about 5 seconds.

20. The method of claim 1, 7, or 12, wherein the mixture is maintained at a temperature of about 300° K to form nanoparticles in the mixture.

21. A method for preparing cerium oxide nanoparticles, comprising the steps of:
(a) providing a first aqueous solution comprising cerium nitrate in a mixing vessel;
(b) rapidly adding a second aqueous solution comprising hexamethylenetetramine to the first aqueous solution in the mixing vessel to form a mixture; and
(c) maintaining the mixture at a temperature no higher than about 320° K to form the nanoparticles in the mixture; and
(d) separating the nanoparticles formed in step (c) from the mixture.

22. The method of claim 21, wherein the mixing vessel has at least one inlet, and step (b) comprises rapidly pumping the second aqueous solution through the at least one inlet into the mixing vessel containing the first solution to form the mixture.

23. A method for preparing cerium oxide nanoparticles, comprising the steps of:
(a) providing a first aqueous solution comprising hexamethylenetetramine in a mixing vessel;
(b) rapidly adding a second aqueous solution comprising cerium nitrate to the first aqueous solution in the mixing vessel to form a mixture;
(c) maintaining the mixture at a temperature no higher than about 320° K to form the nanoparticles in the mixture; and
(d) separating the nanoparticles formed in step (c) from the mixture.

24. The method of claim 23, wherein the mixing vessel has at least one inlet, and step (b) comprises rapidly pumping the second aqueous solution through the inlet into the mixing vessel containing the first solution to form the mixture.

25. The method of claim 21 or 23, wherein the step of separating the nanoparticles from the mixture comprises centrifuging the mixture.

26. The method of claim 21 or 23, wherein the step of separating the nanoparticles from the mixture comprises positioning the mixing vessel inside a centrifuge, and centrifuging the mixture in the mixing vessel.

27. The method of claim 21 or 23, wherein the mixture is maintained at a temperature of about 300° K to form nanoparticles in the mixture.

28. An apparatus for the preparation of cerium oxide nanoparticles, comprising a centrifuge and a mixing vessel, wherein the mixing vessel is adapted to be positioned inside the centrifuge, the mixing vessel having
(a) a first compartment for holding a first aqueous solution comprising cerium nitrate;
(b) a second compartment for holding a second aqueous solution comprising hexamethylenetetramine; and
(c) a retractable partition separating the first and second compartments, wherein when the retractable partition is retracted, rapid mixing of the first and second aqueous solutions takes place to form a mixture, and the mixture in the mixing vessel is maintained at a temperature no higher than 320° K to form nanoparticles therein.

29. The apparatus of claim 28, wherein the retractable partition is a vertical partition.

30. The apparatus of claim 28, wherein the mixing vessel further comprises a mechanical stirrer for stirring the mixture.

31. The apparatus of claim 30, wherein the mechanical stirrer comprises a rotatable vertical stirring rod having a plurality of stirring elements attached thereto.

32. The apparatus of claim 31, wherein the vertical stirring rod has a first aperture for fitting a first inlet feed and a second aperture for fitting a second inlet feed, wherein the first aqueous solution is provided through the first inlet feed into the first compartment and the second aqueous solution is provided through the second inlet feed into the second compartment.

33. The apparatus of claim 32, wherein the vertical stirring rod further comprises an outlet drain for the removal of liquid from the mixing vessel.

34. The apparatus of claim 28, wherein the mixing vessel is maintained at a temperature of about 300° K to form nanoparticles therein.

35. A method for preparing cerium oxide nanoparticles containing a metal selected from the group consisting of platinum, gold, palladium, copper and nickel, wherein the method comprises the steps of:
 (a) providing a first aqueous solution comprising cerium nitrate;
 (b) providing a second aqueous solution comprising hexamethylenetetramine;
 (c) mixing the first and second aqueous solutions to form a mixture;
 (d) maintaining the mixture at a temperature no higher than about 320° K, to form nanoparticles therein;
 (e) separating the nanoparticles formed in step (d) from the mixture; and
 (f) soaking the nanoparticles separated from the mixture in a solution comprising ions or complex ions of the metal.

36. The method of claim 35, wherein the metal comprises platinum, and step (f) comprises soaking the nanoparticles in a solution comprising chloroplatinic acid.

37. The method of claim 35, wherein the mixture is maintained at a temperature of about 300° K to form nanoparticles therein.

* * * * *

UNITED STATES PATENT AND TRADEMARK OFFICE
CERTIFICATE OF CORRECTION

| | |
|---|---|
| PATENT NO. | : 7,141,227 B2 |
| APPLICATION NO. | : 10/465942 |
| DATED | : November 28, 2006 |
| INVENTOR(S) | : Siu-Wai Chan et al. |

It is certified that error appears in the above-identified patent and that said Letters Patent is hereby corrected as shown below:

On page 1, Column 1, line 14, please insert the following header and paragraph:

--Statement Regarding Federally Sponsored Research or Development
This invention was made with government support under grant number 9809687 awarded by the National Science Foundation. The government has certain rights in the invention.--

Signed and Sealed this
Thirteenth Day of November, 2012

David J. Kappos
*Director of the United States Patent and Trademark Office*